(12) United States Patent
Toft et al.

(10) Patent No.: US 12,008,740 B2
(45) Date of Patent: Jun. 11, 2024

(54) FEATURE MATCHING USING FEATURES EXTRACTED FROM PERSPECTIVE CORRECTED IMAGE

(71) Applicant: Niantic, Inc., San Francisco, CA (US)

(72) Inventors: Carl Sebastian Toft, Gothenburg (SE); Daniyar Turmukhambetov, London (GB); Gabriel J. Brostow, London (GB)

(73) Assignee: NIANTIC, INC., San Francisco, CA (US)

(*) Notice: Subject to any disclaimer, the term of this patent is extended or adjusted under 35 U.S.C. 154(b) by 70 days.

(21) Appl. No.: 17/396,568

(22) Filed: Aug. 6, 2021

(65) Prior Publication Data

US 2022/0051372 A1 Feb. 17, 2022

Related U.S. Application Data

(60) Provisional application No. 63/064,621, filed on Aug. 12, 2020.

(51) Int. Cl.
*G06T 5/80* (2024.01)
*G06T 3/00* (2006.01)
(Continued)

(52) U.S. Cl.
CPC ............... *G06T 5/80* (2024.01); *G06T 3/00* (2013.01); *G06T 7/187* (2017.01); *G06T 7/50* (2017.01);
(Continued)

(58) Field of Classification Search
CPC .......... G06T 5/006; G06T 3/00; G06T 7/187; G06T 7/50; G06T 7/74;
(Continued)

(56) References Cited

U.S. PATENT DOCUMENTS 9,965,865 B1 * 5/2018 Agrawal ............ G06V 10/7747
2005/0012757 A1 * 1/2005 Park ...................... G06T 15/205
345/582

(Continued)

FOREIGN PATENT DOCUMENTS

KR 10-2014-0110586 A 9/2014
KR 20140110586 A * 9/2014 ............. G06T 7/004
(Continued)

OTHER PUBLICATIONS

Eigen, D. et al. "Predicting Depth, Surface Normals and Semantic Labels with a Common Multi-Scale Convolutional Architecture." Proceedings of the IEEE International Conference on Computer Vision (ICCV), Dec. 7-13, 2015, pp. 2650-2658.
(Continued)

*Primary Examiner* — Ian L Lemieux
*Assistant Examiner* — Woo C Rhim
(74) *Attorney, Agent, or Firm* — FENWICK & WEST LLP

(57) ABSTRACT

An image localization system receives an image of a scene and generates a depth map for the image by inputting the image to a model trained for generating depth maps for images. The system determines surface normal vectors for the pixels in the depth map. The system clusters the surface normal vectors to identify regions in the image corresponding to planar surfaces. The system partitions the image into patches, each of which is a region of connected pixels in the image and corresponds to a cluster of surface normal vectors. The system rectifies the perspective distortion of patches and extracts perspective corrected features from the rectified patches. The system matches the perspective corrected features of the image with perspective corrected features of other images for three-dimensional re-localization.

20 Claims, 8 Drawing Sheets

(51) Int. Cl.
    *G06T 7/187*     (2017.01)
    *G06T 7/50*     (2017.01)
    *G06T 7/73*     (2017.01)
    *H04N 5/262*     (2006.01)
    *A63F 13/216*     (2014.01)
    *A63F 13/65*     (2014.01)

(52) U.S. Cl.
    CPC ............. *G06T 7/74* (2017.01); *H04N 5/2628* (2013.01); *A63F 13/216* (2014.09); *A63F 13/65* (2014.09); *A63F 2300/69* (2013.01); *G06T 2207/20081* (2013.01); *G06T 2207/20084* (2013.01); *G06T 2207/30244* (2013.01)

(58) Field of Classification Search
    CPC . G06T 2207/20081; G06T 2207/20084; G06T 2207/30244; G06T 2207/10028; H04N 5/2628; A63F 13/216; A63F 13/65; A63F 2300/69
    See application file for complete search history.

(56) References Cited

U.S. PATENT DOCUMENTS

| | | | | |
|---|---|---|---|---|
| 2007/0126876 | A1* | 6/2007 | Gallagher | H04N 5/2628 348/E5.041 |
| 2010/0315412 | A1* | 12/2010 | Sinha | G06T 7/536 345/419 |
| 2011/0293137 | A1* | 12/2011 | Gurman | G06T 7/11 382/103 |
| 2012/0099782 | A1* | 4/2012 | Rhee | G06V 20/64 382/154 |
| 2012/0183203 | A1* | 7/2012 | Han | G06V 40/11 382/154 |
| 2014/0037191 | A1* | 2/2014 | Litvak | G06V 10/462 382/154 |
| 2014/0285690 | A1* | 9/2014 | Benedetti | G06K 7/1439 348/241 |
| 2015/0206337 | A1* | 7/2015 | Roimela | G06T 7/60 345/419 |
| 2016/0284092 | A1* | 9/2016 | Matsushita | G06F 18/22 |
| 2017/0069071 | A1* | 3/2017 | Jung | G06V 20/64 |
| 2017/0085863 | A1* | 3/2017 | Lopez | H04N 13/261 |
| 2017/0243352 | A1* | 8/2017 | Kutliroff | G06T 19/006 |
| 2019/0087979 | A1* | 3/2019 | Mammou | G06T 9/004 |
| 2019/0213481 | A1* | 7/2019 | Godard | G06V 10/764 |
| 2020/0035019 | A1* | 1/2020 | Cappello | G06T 7/536 |
| 2020/0111237 | A1* | 4/2020 | Tourapis | H04N 19/597 |
| 2020/0160546 | A1* | 5/2020 | Gu | G06N 3/08 |
| 2020/0195904 | A1* | 6/2020 | Tauber | G01B 11/245 |
| 2020/0226773 | A1* | 7/2020 | Gan | G06N 3/088 |
| 2020/0250889 | A1* | 8/2020 | Li | G06T 19/20 |
| 2020/0312042 | A1* | 10/2020 | Sardari | G06T 7/50 |
| 2020/0410699 | A1* | 12/2020 | Badrinarayanan | G06N 3/08 |
| 2021/0004979 | A1* | 1/2021 | Valentin | G06T 19/006 |
| 2021/0082135 | A1* | 3/2021 | Xu | G06T 5/50 |
| 2021/0142497 | A1* | 5/2021 | Pugh | G06T 7/55 |
| 2021/0209779 | A1* | 7/2021 | Yeh | G06T 7/62 |
| 2021/0279909 | A1* | 9/2021 | Zhou | G06T 7/74 |
| 2021/0375044 | A1* | 12/2021 | George | G06T 15/04 |

FOREIGN PATENT DOCUMENTS

| | | | | |
|---|---|---|---|---|
| KR | 101589167 | B1 * | 1/2016 | |
| KR | 20160034756 | A * | 3/2016 | |
| KR | 20210001005 | A * | 1/2021 | |
| TW | 201928788 | A | 7/2019 | |
| TW | 202018659 | A | 5/2020 | |
| TW | M597478 | U | 6/2020 | |
| WO | WO-2014147863 | A1 * | 9/2014 | ............ G06T 7/004 |
| WO | WO-2020192706 | A1 * | 10/2020 | |

OTHER PUBLICATIONS

Taiwan Intellectual Property Office, Office Action, Taiwanese Patent Application No. 110129856, dated Jan. 24, 2022, nine pages.
Taiwan Intellectual Property Office, Office Action, Taiwanese Patent Application No. 110129856, dated Jul. 19, 2022, eight pages.
Toft, C. et al. "Single-Image Depth Prediction Makes Feature Matching Easier." European Conference on Computer Vision, Aug. 2020, pp. 473-492.
Hinterstoisser, S. et al., "Learning Real-Time Perspective Patch Rectification," International Journal of Computer Vision, Sep. 2011, pp. 1-19.
PCT International Search Report and Written Opinion, PCT Application No. PCT/IB2021/057342, dated Nov. 12, 2021, ten pages.

* cited by examiner

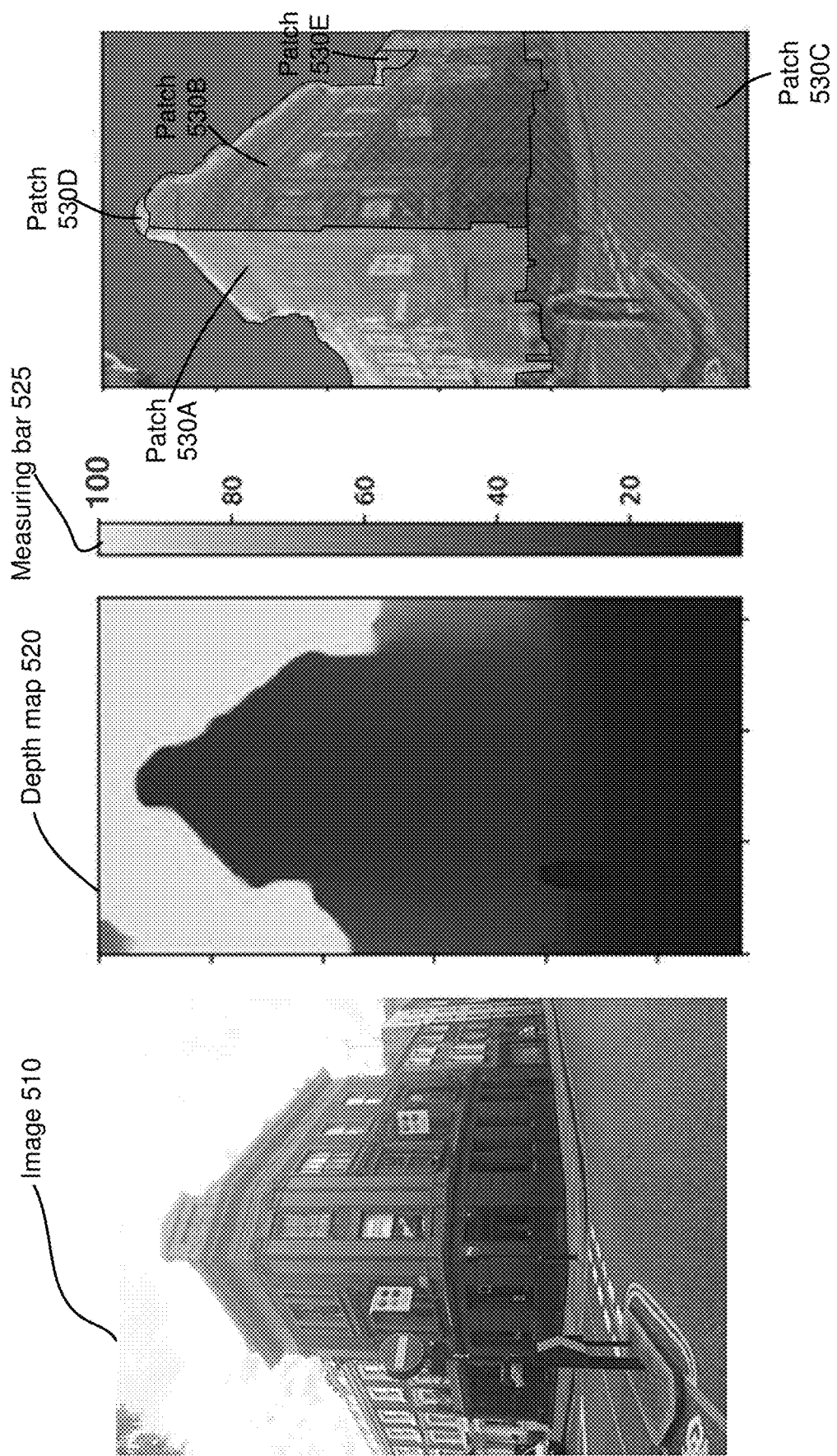

550

FEATURE MATCHING USING FEATURES EXTRACTED FROM PERSPECTIVE CORRECTED IMAGE

CROSS-REFERENCE TO RELATED APPLICATION

This application claims the benefit of U.S. Provisional Patent Application No. 63/064,621, filed on Aug. 12, 2020, which is incorporated by reference herein in their entirety.

BACKGROUND

1. Technical Field

The subject matter described relates generally to computer vision, and in particular to feature matching using features extracted from perspective corrected images.

2. Problem

Feature matching is useful for three-dimensional (3D) re-localization and multi-view reconstruction in various applications, such as augmented/virtual/mixed reality (e.g., parallel reality game), robot navigation (e.g., self-driving vehicle), and so on. However, the viewing angle and distance of an image can greatly impact recognizability of features in the image. Conventional methods to improve the appearance in images, such as by choosing better local feature points or leveraging outside information, can be impractical given the prerequisites of using those methods, such as collecting training data with large appearance variations. Improved technology for feature matching is needed to enable better 3D re-localization and multi-view reconstruction.

SUMMARY

The present disclosure describes a feature matching system that uses depth estimation to remove perspective distortions in an image. The feature matching system extracts features from the image after it removes the perspective distortions and uses the perspective corrected features for feature matching.

In some embodiments, the feature matching system receives an image depicting a scene. The image may be a monocular image. The feature matching system generates a depth map of the image. For instance, the feature matching module inputs the image into a neural network, and the neural network outputs the depth map. The depth map includes pixels and the feature matching system estimates a surface normal vector for each pixel in the depth map (or a subset of the pixels). The feature matching system clusters the pixels based on their surface normal vectors. As each pixel of the depth map corresponds to an element (e.g., a pixel) of the image, the feature matching system can cluster the pixels of the images based on the clusters of the pixels of the depth map. The feature matching system uses the clusters to partition the image into patches. Each patch corresponds to a cluster and includes a region of connected pixels in the image.

The feature matching system further rectifies a perspective of each patch and generates a rectified patch. In some embodiments, the feature matching system uses a homography to perform a projective transformation. The homography, when applied to a patch, removes perspective distortion from the patch and transforms the patch to a rectified patch. The feature matching system extracts perspective corrected features from the rectified patches.

The feature matching system matches the perspective corrected features of the image with perspective corrected features of other images (or with a 3D model of a scene) to re-localize an object in the scene or reconstruct the scene with multi-view methods. As perspective distortions are removed from the image by rectifying the patches before feature extraction, the feature matching system can conduct effective feature matching even under large perspective variations. Compared with conventional feature matching methods, the feature matching system may enable more robust feature matching and, therefore, better 3D re-localization and multi-view 3D reconstruction.

BRIEF DESCRIPTION OF THE DRAWINGS

FIGS. 5A-E illustrate a pipeline performed by the feature matching system in FIG. 4 to extract perspective corrected features from an image, according to one embodiment.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining depth information from image data is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
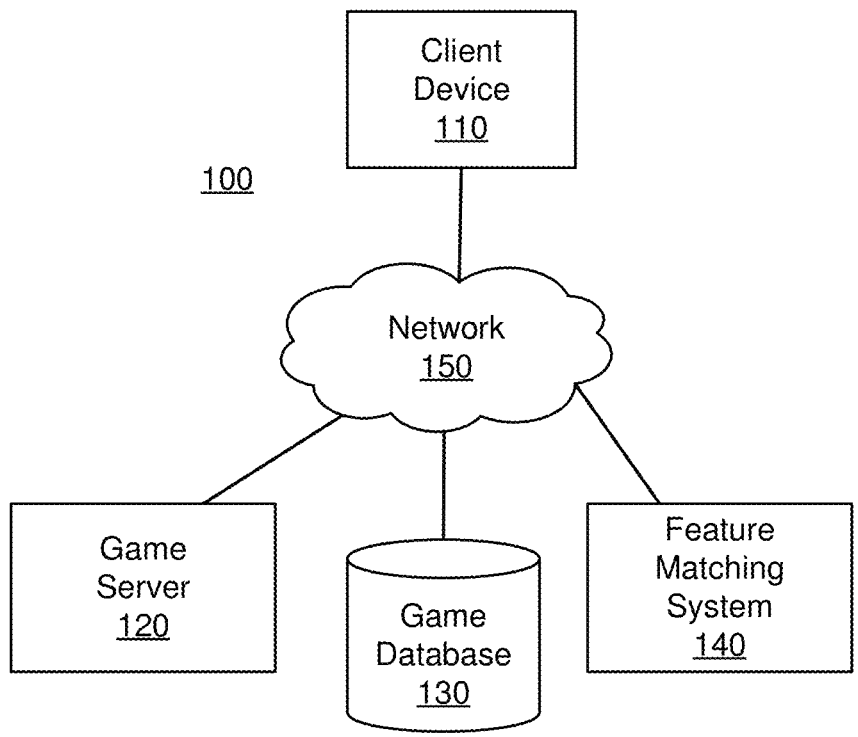
FIG. 1 is a block diagram of a networked computing environment suitable for hosting a parallel reality game, according to one embodiment.

FIG. 1 is a block diagram of a networked computing environment 100 suitable for hosting a parallel reality game, according to one embodiment. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The networked computing environment 100 uses a client-server architecture, where a game server 120 communicates with a client device 110 over a network 150 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 150.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet. Various embodiments of the client device 110 are described in greater detail below, with reference to FIG. 2.

The game server 120 can be any computing device and can include one or more processors and one or more computer-readable storage media. The computer-readable storage media can store instructions which cause the processor to perform operations. In various embodiments, the game server 120 maintains a copy of a master game state and manages interactions between client devices 110 of players such that all of the players interact with a consistent game world.

The game server 120 can be configured to receive requests for game data from a client device 110 (for instance via remote procedure calls (RPCs)) and to respond to those requests via the network 150. For instance, the game server 120 can encode game data in one or more data files and provide the data files to the client device 110. In addition, the game server 120 can be configured to receive game data (e.g. player positions, player actions, player input, etc.) from a client device 110 via the network 150. For instance, the client device 110 can be configured to periodically send player input and other updates to the game server 120, which the game server 120 uses to update game data in the game database 130 to reflect any and all changed conditions for the game. Various embodiments of the game server 120 are described in greater detail below, with reference to FIG. 3.

The game server 120 can include or can be in communication with a game database 130. The game database 130 stores game data used in the parallel reality game to be served or provided to the client device(s) 110 over the network 150. The game data stored in the game database 130 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 130 can be populated either offline or in real time by system administrators or by data received from users/players of the game, such as from a client device 110 over the network 150.

The feature matching system 140 matches features of an image depicting a scene with features of other images depicting the scene (or with a 3D model of the scene) for 3D re-localization or multi-view reconstruction. The images (or the 3D model) may be received from client devices 110, the game server 120, the game database 130, or a third-party system. An image is usually associated with perspective distortion due to the position and orientation of the camera capturing the image. Perspective distortion is a visual effect observed in an image whereby objects appear smaller as their distance from the camera increases or when an object is angled toward the viewer. As different images of the same scene can be captured by cameras with different positions and orientations, there can be large perspective variations among the images. Also, different portions of the same image can have different perspective distortions given differences in the position of the camera in relative to different locations in the scene. The feature matching system 140 corrects perspective distortions in the image before it extracts features from the image so that the extracted features are perspective corrected features. As the perspective distortions are removed, the feature matching using the extracted features is effective despite large perspective variations.

The feature matching system 140 removes the perspective distortions from the image by using a depth map of the image. In some embodiments, the feature matching system 140 generates the depth map by using a model that is trained to receive images and to output depth maps of the images. The feature matching system 140 may determine a surface normal vector for each pixel. The surface normal vector of a pixel is a vector perpendicular to the tangent plane of the surface at the pixel.

In one embodiment, the feature matching system 140 groups the pixels into clusters based on their surface normal vectors, e.g., by using k-means clustering. Each cluster is associated with a cluster surface normal vector. The cluster surface normal vector may be the surface normal vector of the cluster centroid. As each pixel of the depth map corresponds to an element (e.g., a pixel) of the image, the feature matching system 140 can also classify the corresponding pixels of the images into the clusters. The feature matching system 140 generates patches from the image based on the clusters. Each patch is a portion of the image, e.g., a region of connected pixels of the image. As pixels having the same surface normal are on the same planar surface, the patch corresponds to a planar surface in the scene, e.g., a building wall, the ground, the sky, an object surface, etc.

Additionally, the feature matching system 140 may rectify the perspective of each patch, e.g., by using a homography. The feature matching system 140 computes a homography and applies the homography on the patch. The homography performs a projective transformation and remove perspective distortion from the patch. The homography transforms the patch into a rectified patch. The rectified patch has a perpendicular view of the content in the patch. The feature matching system 140 extracts features from the rectified patches. In some embodiments, the image may include one or more non-planar portions, i.e., portions not included in any of the patches. The feature matching system combines the patches and the non-planar portions (if any) to generate a perspective corrected image and extracts features from the perspective corrected image.

In one use case, the feature matching system 140 matches the extracted features with features of another image or a 3D model of the same scene depicted in the image. In various embodiments, the feature matching system 140 applies a matching model to generate a mapping indicating how the extracted features of the image translate onto the features of the other image or onto a component in the 3D model of the scene. This mapping may be used to provide augmented reality content. For example, for a client device 110 with a camera that captures overlapping portions of a scene, the matching model may be used to obtain a greater understanding of the portion(s) of scene captured by the camera such that augmented reality content (e.g., an AR character) interacts with the scene in a more realistic manner.

In some embodiments, the feature matching system 140 can be a part of the game server 120 or a client device 110.

Various embodiments of the feature matching system 140 are described in greater detail below, with reference to FIG. 4.

The network 150 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. Furthermore, the networked computing environment 100 may contain different or additional elements and functionality may be distributed between the client device 110, server 120, database 130, and feature matching system 140 in a different manner than described.

In situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 2:
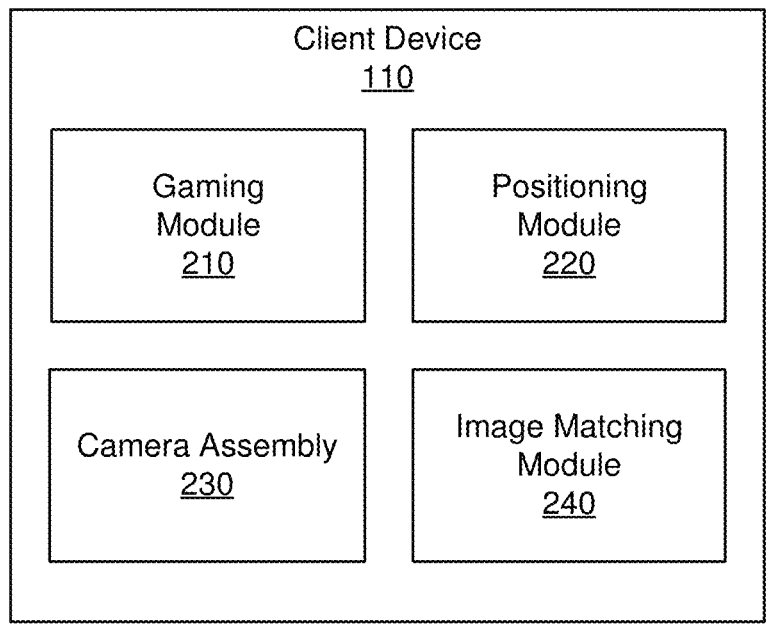
FIG. 2 is a block diagram of the client device of FIG. 1, according to one embodiment.

FIG. 2 is a block diagram of the client device 120 of FIG. 1, according to one embodiment. In the embodiment shown, the client device 120 includes a gaming module 210, a positioning module 220, a camera assembly 230, and an image matching module 240. In other embodiments, a client device 120 may include different or additional elements. Furthermore, the functionality may be distributed among the elements in different way than described.

The gaming module 210 provides a player with an interface to participate in the parallel reality game. The game server 120 transmits game data over the network 150 to the client device 110 for use by the gaming module 210 to provide local versions of the game to players at locations remote from the game server 120. In one embodiment, the gaming module 210 presents a user interface on a display device associated with the client device 110 that displays a virtual world (e.g. renders imagery of the virtual world) associated with the game and allows a user to interact in the virtual world to perform various game objectives. In some embodiments, the gaming module 210 presents image data from the real world (e.g., captured by the camera assembly 230) augmented with virtual elements from the parallel reality game. In these embodiments, the gaming module 210 may generate virtual content or adjust virtual content according to other information received from other components of the client device 110. For example, the gaming module 210 may adjust a virtual object to be displayed on the user interface according to a depth map of the scene captured in the image data (e.g., as generated by a depth estimation model).

The gaming module 210 can also control various other outputs to allow a player to interact with the game without requiring the player to view a display screen. For instance, the gaming module 210 can control various audio, vibratory, or other notifications that allow the player to play the game without looking at the display screen. The gaming module 210 can access game data received from the game server 120 to provide an accurate representation of the game to the user. The gaming module 210 can receive and process player input and provide updates to the game server 120 over the network 150. The gaming module 210 may also generate or adjust game content to be displayed by the client device 110. For example, the gaming module 210 may generate a virtual element based on depth information (e.g., as determined by a depth estimation model applied to one or more images captured by the camera assembly 230).

The positioning module 220 can be any device or circuitry for monitoring the position of the client device 110. For example, the positioning module 220 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 220 may further include various other sensors that may aid in accurately positioning the client device 110 location.

As the player moves around with the client device 110 in the real world, the positioning module 220 tracks the position of the player and provides the player position information to the gaming module 210. The gaming module 210 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 210 can provide player position information to the game server 120 over the network 150. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The camera assembly 230 includes one or more cameras configured to capture images of the physical environment in which the client device 110 is located. The portion of the physical environment depicted in an image is referred to as a scene. The camera assembly 230 captures image data corresponding to the scene and stores it in a storage medium of the client device. Additionally or alternatively, the image data may be sent to the game server 120 via the network 150. The camera assembly 230 may utilize a variety of varying photo sensors with varying color capture ranges at varying capture rates. The camera assembly 230 may contain a wide-angle lens or a telephoto lens. The camera assembly 230 may be configured to capture single images or video as the image data. The client device 110 may also include other sensors for recording data about the client device's physical environment, such as accelerometers, gyroscopes, inertial measurement units (IMUs), barometers, thermometers, light sensors, microphones, etc. The image data can be appended with metadata describing other details of the image data including sensory data (e.g. temperature, brightness of environment) or capture data (e.g. exposure, warmth, shutter speed, focal length, capture time, etc.).

The image matching module 240 receives images captured by the camera assembly 230 and conducts feature matching on the images. In some embodiments, the image matching module 240 sends the captured images to the feature matching system 140 for feature extraction and matching. In other embodiments, the image matching module 240 performs feature extraction and matching by using the method described above in conjunction with the feature matching system 140.

In configurations where the client device 120 has two or more cameras, the image matching module 240 may also perform stereo matching to learn more information about the scene depicted in images captured by the cameras. In one embodiment, the image matching module 240 take a stereo pair of images and determines the per-pixel horizontal displacement (i.e., disparity) between pixels in the left image to the right image, or vice versa. Because the two images are captured by cameras of a single device, the cameras have known poses relative to each other. Alternatively, the stereo pair may be a pair of frames in a video captured by a single camera.

In various embodiments, the image matching module 240 applies a stereo matching model to generate a mapping indicating how the pixels of one image translate onto the pixels of the other image in the pair. This mapping may be used to provide augmented reality content. For example, for a client device 110 with two or more images that capture overlapping portions of a scene, whereby images are captured from one or more cameras with known or estimated position with respect to each other, the stereo matching model may be used to obtain a greater understanding of the portion(s) of scene captured by two or more cameras such that augmented reality content (e.g., an AR character) interacts with the scene in a more realistic manner. Furthermore, the client device 110 may include a depth estimation model (e.g., a machine learning model as used by the depth estimation module 410) for estimating the distance between the camera assembly 230 and the physical object corresponding to each pixel in an image.

Figure 3:
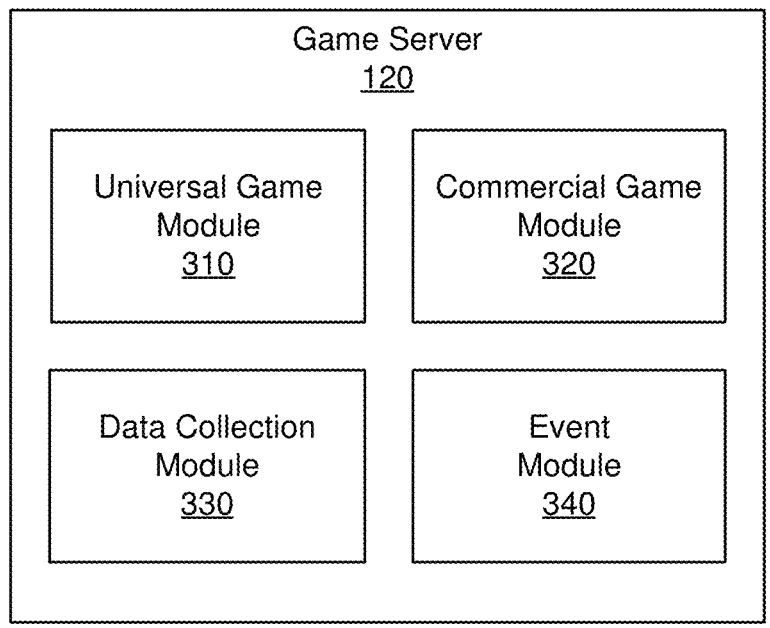
FIG. 3 is a block diagram of the game server of FIG. 1, according to one embodiment.

FIG. 3 is a block diagram of the game server 120 of FIG. 1, according to one embodiment. In the embodiment shown, the game server 120 includes a universal gaming module 310, a commercial game module 320, a data collection module 330, and an event module 340. As mentioned above, the game server 120 interacts with a game database 130 that may be part of the game server 120 or accessed remotely (e.g., the game database 130 may be a distributed database accessed via the network 150). In other embodiments, the game server 120 contains different or additional elements. In addition, the functions may be distributed among the elements in a different manner than described. For instance, the game database 130 can be integrated into the game server 120.

The universal game module 310 hosts the parallel reality game for all players and acts as the authoritative source for the current status of the parallel reality game for all players. As the host, the universal game module 310 generates game content for presentation to players, e.g., via their respective client devices 110. The universal game module 310 may access the game database 130 to retrieve or store game data when hosting the parallel reality game. The universal game module 310 also receives game data from client device 110 (e.g. depth information, player input, player position, player actions, landmark information, etc.) and incorporates the game data received into the overall parallel reality game for all players of the parallel reality game. The universal game module 310 can also manage the delivery of game data to the client device 110 over the network 150. The universal game module 310 may also govern security aspects of client device 110 including but not limited to securing connections between the client device 110 and the game server 120, establishing connections between various client device 110, and verifying the location of the various client device 110.

The commercial game module 320, in embodiments where one is included, can be separate from or a part of the universal game module 310. The commercial game module 320 can manage the inclusion of various game features within the parallel reality game that are linked with a commercial activity in the real world. For instance, the commercial game module 320 can receive requests from external systems such as sponsors/advertisers, businesses, or other entities over the network 150 (via a network interface) to include game features linked with commercial activity in the parallel reality game. The commercial game module 320 can then arrange for the inclusion of these game features in the parallel reality game.

The data collection module 330, in embodiments where one is included, can be separate from or a part of the universal game module 310. The data collection module 330 can manage the inclusion of various game features within the parallel reality game that are linked with a data collection activity in the real world. For instance, the data collection module 330 can modify game data stored in the game database 130 to include game features linked with data collection activity in the parallel reality game. The data collection module 330 can also analyze and data collected by players (e.g., as part of a crowd-sourcing effort) and provide the data for access by various platforms. To provide a specific example, players may be prompted to submit photographs of landmarks and other features of interest in their environment and the data collection module 330 may incorporate virtual elements corresponding to the real-world landmarks or features into the parallel reality game based on player submissions (e.g., subject to verifying that the landmark exists and is located where the submitting player indicated).

The event module 340 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

Figure 4:
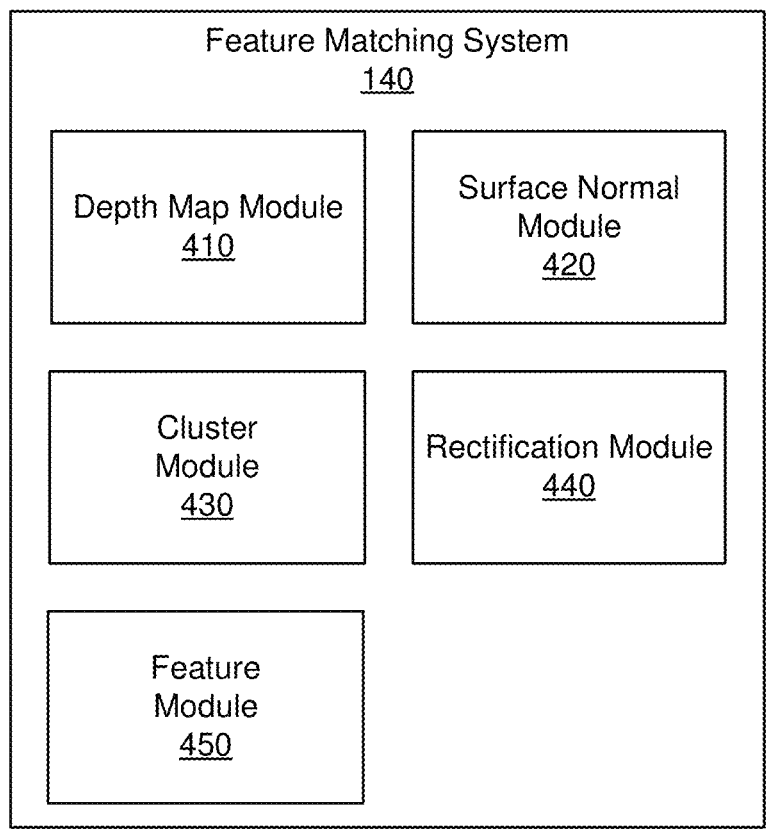
FIG. 4 is a block diagram of the feature matching system of FIG. 1, according to one embodiment.

FIG. 4 is a block diagram of the feature matching system 140 of FIG. 1, according to one embodiment. In the embodiment shown, the feature matching system 140 includes a depth map module 410, a surface normal module 420, a cluster module 430, a rectification module 440, and a feature module 450. In other embodiments, the feature matching system 140 includes different or additional elements. In addition, the functions may be distributed among the elements in a different manner than described.

The feature matching system 140 extracts perspective corrected features from images and uses the perspective corrected features for feature matching. FIGS. 5A-E illustrate an example pipeline performed by one embodiment of the feature matching system 140 to extract perspective corrected features from an image 510. In the embodiment shown in FIG. 4, the feature matching system 400 includes a depth map module 410, a surface normal module 420, a cluster module 430, a rectification module 440, and a feature module 450. In other embodiments, the feature matching system 400 contains different or additional elements. In addition, the functions may be distributed among the elements in a different manner than described.

The depth map module 410 receives the image 510 shown in FIG. 5A and generates a depth map 520 shown in FIG. 5B for the image 510. The image 510 depicts a scene. The scene may include various objects, such as buildings, streets, people, vehicles, the sky, and so on. An object in the scene may not be completely in the image 510 or may be partially captured by the image 510. The depth map 520 of the image 510 includes pixels, with each pixel indicating a depth value (e.g., a value in meters) of an element (e.g., a pixel) of the image. FIG. 5B includes a measuring bar 525 indicating depth values in a range from 0 to 100 meters. In some embodiments, the depth map module 410 uses a model to generate the depth map 520. The model is trained by using machine learning techniques based on a training data set. The training data set includes images and a corresponding depth maps (e.g., determined using a stereo camera, lidar, or other ground truth depth determination techniques). The model is trained to receive an image and outputs a depth map of the image. An example of the model is a neural network, e.g., convolutional neural network. The depth map module 410 retrieves the depth map 520 from an output layer of the neural network.

The surface normal module 420 determines a surface normal vector for each (or a subset of) of the pixels in the depth map 520. In some embodiments, the surface normal module 420 converts the depth map 520 into a point cloud by back projecting the pixels in the depth map 520. Each pixel is represented by a point in the point cloud. In one embodiment, the surface normal module 420 applies a window (such as a 5×5 window) centered on a pixel. The surface normal module 420 fits a plane to the back-projected points corresponding to the window. For a 5×5 window, there are 25 back-projected points. The surface normal module 420 takes the unit normal vector of the plane as the surface normal vector of the pixel.

The cluster module 430 classifies the pixels of the depth map 520 into clusters based on the surface normal vectors of the pixels. Each cluster includes a subset of the pixels. In some embodiments, the cluster module 430 classifies the surface normal vectors of the pixels by using k-means clustering, as all points on the same plane in the point cloud share the same or similar surface normal vectors. The cluster module 430 classifies a pixel to the cluster with the closest cluster centroid. A cluster may include its antipodal point. For instance, the surface normal vector of pixels corresponding to two opposing walls are classified into the same cluster. The cluster module 430 classifies the pixels based on the classification of their surface normal vectors by assigning each pixel to a cluster corresponding to its surface normal vector.

Each cluster of surface normal vectors can represent a dominating direction in the point cloud. Each cluster of pixels can represent a dominant plane in the scene, such as the ground, a building wall, the sky, etc. In one embodiment, the cluster module 430 classifies the pixels into three clusters. The three clusters correspond to three planes that are orthogonal to each other in a three-dimensional space.

The cluster module 430 uses the clusters to partition the image 510 into patches to identify planar surfaces in the image 510. Each patch is a region of connected pixels of the image 510. Each patch corresponds to a cluster and includes pixels in the image 510 that correspond to the pixels of the depth map 520 in the cluster. As shown in FIG. 5C, the image 510 is partitioned into five patches 530A-E. The patch 530A corresponds to a side of the building. The patch 530B corresponds to another side of the building. The patch 530C corresponds to the ground. The patches 530D and 530E correspond to two corners of the building, respectively.

In FIG. 5C, the patch(es) generated from each respective cluster is represented by a different pattern. FIG. 5C shows patches with three different patterns: the patch 530A has a dotted pattern, the patch 530B has a grid pattern, and the patches 530C-E have a diagonal line pattern. That indicates that the cluster module 430 has classified the pixels of the depth map 520 into three clusters, representing three dominating surfaces in the scene, which include two building walls and the ground. For the cluster corresponding to the ground, the cluster module 430 generates three patches 530C-E. In some embodiments, the cluster module 430 can identify multiple regions of connected pixels for one cluster.

The rectification module 440 rectifies the viewpoint of each patch based on the surface normal vectors of the pixels in the corresponding cluster. In some embodiments, the rectification module 440 computes a homography for each patch to remove perspective distortions from the patch. The homography, when applied on the patch, performs a projective transformation and outputs a rectified patch, i.e., the patch with a corrected perspective. The homography simulates a virtual camera that has the same camera center/position as the camera capturing the image but has an optical axis along the surface normal of the patch, i.e., as if the virtual camera is facing the patch straight on. The surface normal of the patch may be the surface normal of a pixel in the corresponding cluster or a mean of the surface normal vectors of the pixels in the corresponding cluster. The rectified patch is a patch as it would have been seen in the virtual camera. Each of the rectified patches 540A, 540B, and 540C has a perpendicular view of a dominating plane in the image.

In some embodiments, the rectification module 440 rectifies a part of a patch, as opposed to the whole patch. For a patch having a plane surface at a glancing angle of the camera capturing the image 510, some portions of the rectified patch would be occupied by distorted or stretched regions if the whole patch is rectified. The rectification module 440 determines whether an angle difference between an optical axis of the camera and the estimated surface normal of the patch is greater than 80 degrees. In response to determining that the angle difference is greater than 80 degrees, the rectification module 440 identifies a portion of the patch that an angle difference between the optical axis of the camera and a surface normal of the identified portion of the patch is not greater than 80 degrees. The rectification module 440 rectifies the identifying portion of the patch without rectifying the rest of the patch.

Figure 5D:
Figure 5D:
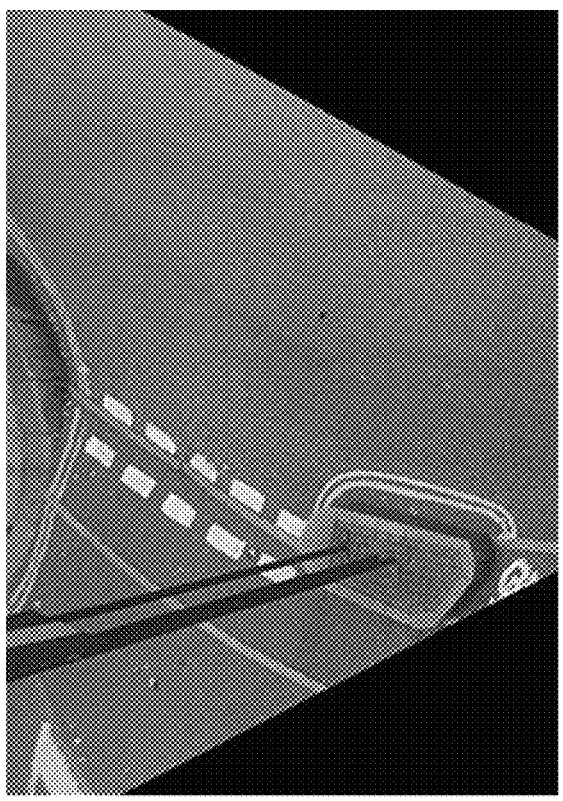
Figure 5D:
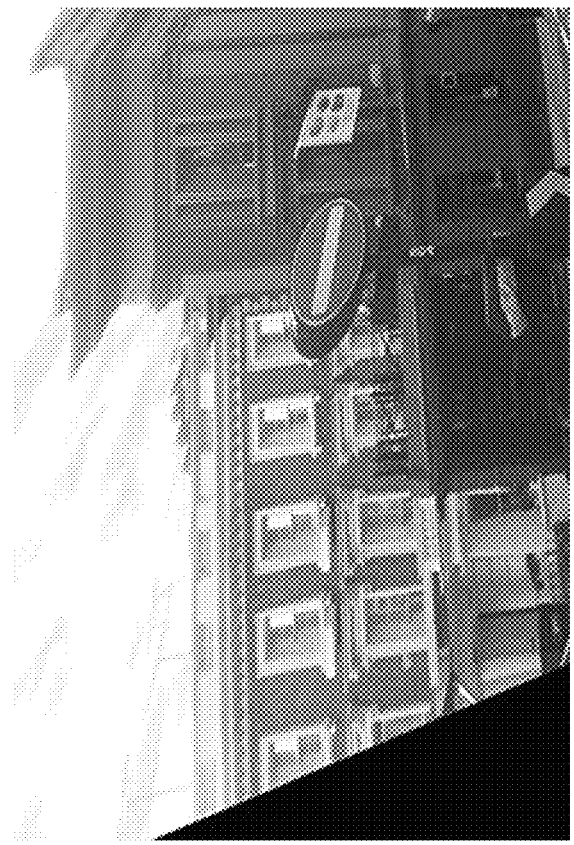
Figure 5E:

In some embodiments, the rectification module 440 determines that no portion of a patch meets the angle different requirement, i.e., the angle difference between the optical axis of the camera and the estimated surface normal is not greater than 80 degrees. The rectification module 440 does not rectify any portion of the patch. FIG. 5D shows the three rectified patches 540A-C generated by the rectification module 440. The rectified patches 540A-C corresponds to the patches 530A-C, respectively. For the patches 530D and 530E, the rectification module 440 determines that no portion of the patches 530D and 530E meet the angle different requirement and does not rectify any portion of the patches 530D and 530E.

The feature module 450 extracts features from the rectified patches 540A-C. A feature is a piece of information about the content of the image 510, e.g., information indicating whether a certain region of the image 510 has certain properties. A feature may be a specific component in the image such as a point, edge, or object. A feature may also be the result of a general neighborhood operation or feature detection applied to the image 510. The feature module 450 can use various algorithms to detect features. Example feature detection algorithms include scale-invariant feature transform (SIFT), SuperPoint, Binary Robust Independent Elementary Features (BRISK), or Oriented FAST and rotated BRIEF (ORB). A feature detection algorithm, when applied to the image 510, outputs feature descriptors. A feature descriptor encodes information of the corresponding feature into a series of numbers. The feature descriptor may function as a fingerprint of the feature and can be used to differentiate the feature from other features.

In some embodiments, the rectified patches 540A-E may not cover the whole image 510. An image may have a non-planar portion, i.e., a portion that is not included in any of the patches generated by the cluster module 430. The feature module 450 identifies the non-planar portion (or non-planar portions) in the image 510, e.g., by comparing the patches 530A-E with the image 510. In some embodiments, the feature module 450 combines the non-planar portion with the patches and generates a perspective corrected image. The feature module 450 extracts features from the perspective corrected image. In some other embodiments, the feature module 450 extracts features from the non-planar portion and from the rectified patches, separately. Then the feature module 450 determines two-dimensional locations of the features extracted from the rectified patches and wraps the features back into a coordinate system of the image 510 without changing the feature descriptors.

The feature module 450 matches the extracted features with features of another image or a three-dimensional model of the scene, e.g., by using the descriptors of the extracted features. The feature matching can be a step of Simultaneous Localization and Mapping (SLAM), Structure-from-Motion (SfM), visual localization, or other computer vision processes. For instance, the feature matching can be used for 3D re-localization (e.g., re-localization of the camera with respect to the 3D map of the surrounding area) in the context of a parallel reality game. It can also be used for multi-view reconstruction of a scene.

In some embodiments, the feature module 450 performs feature matching on image pairs in a dataset by using perspective corrected features. The dataset includes images depicting a plurality of scenes. The images may be originated from continuous video sequences, e.g., video sequences captured by a client device 110. Each scene has number of images captured from different viewpoints, in different environmental conditions, at different positions, under different weather conditions, or some combination thereof. The feature module 450 identifies a plurality of image pairs for each scene. The feature module 450 can use the perspective corrected features to establish two-dimensional or three-dimensional (i.e., stereo) matches. The feature module 450 determines a relative camera pose and compares the relative camera pose to a ground truth relative camera pose of the scene to localize the images (and thus localize the camera that captured the images).

In some embodiments, the feature module 450 inputs the perspective corrected features into a matching model to generate a mapping indicating how the features of one image translate onto the features of the other image in the pair. This mapping may be used to provide augmented reality content. The mapping between the image pairs of a scene can be used to obtain an understanding of the scene where the client device 110 is located, such as 3D position and orientation of the client device 110 with respect to the 3D map of the surrounding scene, irrespective to the weather condition of the scene, environment condition of the scene, and so on, which can enable an AR character to interact with the scene in a realistic manner.

Exemplary Parallel-Reality Game

Figure 6:
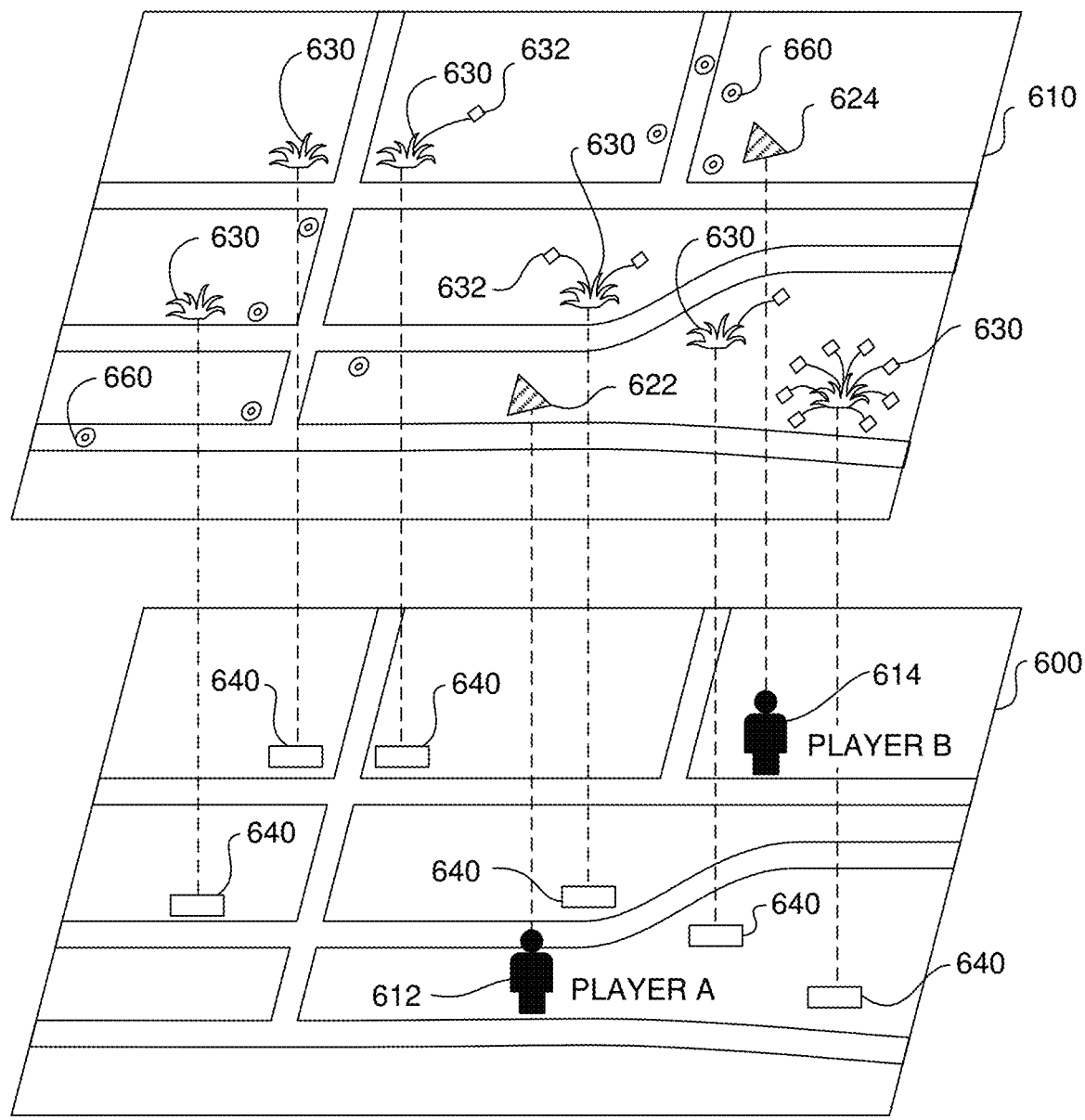
FIG. 6 depicts a representation of a virtual world having a geography that parallels the real world, according to one embodiment.

FIG. 6 depicts a conceptual diagram of a virtual world 610 that parallels the real world 600 that can act as the game board for players of a parallel reality game, according to one embodiment. As illustrated, the virtual world 610 can include a geography that parallels the geography of the real world 600. In particular, a range of coordinates defining a geographic area or space in the real world 600 is mapped to a corresponding range of coordinates defining a virtual space in the virtual world 610. The range of coordinates in the real world 600 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 610 corresponds to the player's position in the real world 600. For instance, the player A located at position 612 in the real world 600 has a corresponding position 622 in the virtual world 610. Similarly, the player B located at position 614 in the real world has a corresponding position 624 in the virtual world. As the players move about in a range of geographic coordinates in the real world, the players also move about in the range of coordinates defining the virtual space in the virtual world 610. In particular, a positioning system (e.g., a GPS system) associated with a mobile computing device carried by the player can be used to track a player's position as the player navigates the range of geographic coordinates in the real world. Data associated with the player's position in the real world 600 is used to update the player's position in the corresponding range of coordinates defining the virtual space in the virtual world 610. In this manner, players can navigate along a continuous track in the range of coordinates defining the virtual space in the virtual world 610 by simply traveling among the corresponding range of geographic coordinates in the real world 600 without having to check in or periodically update location information at specific discrete locations in the real world 600.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 630 located at various virtual locations in the virtual world 610. These virtual elements 630 can be linked to landmarks, geographic locations, or objects 640 in the real world 600. The real-world landmarks or objects 640 can be works of art, monuments, buildings, businesses, libraries, museums, or other suitable real-world landmarks or objects. Interactions include capturing, claiming ownership of, using some virtual item, spending some virtual currency, etc. To capture these virtual elements 630, a player must travel to the landmark or geographic location 640 linked to the virtual elements 630 in the real world and must perform any necessary interactions with the virtual elements 630 in the virtual world 610. For example, player A may have to travel to a landmark 640 in the real world 600 in order to interact with or capture a virtual element 630 linked with that particular landmark 640. The interaction with the virtual element 630 can require action in the real world, such as taking a photograph or verifying, obtaining, or capturing other information about the landmark or object 640 associated with the virtual element 630.

Game objectives may require that players use one or more virtual items that are collected by the players in the location-based game. For instance, the players may travel the virtual world 610 seeking virtual items (e.g. weapons, creatures, power ups, or other items) that can be useful for completing game objectives. These virtual items can be found or collected by traveling to different locations in the real world 600 or by completing various actions in either the virtual world 610 or the real world 600. In the example shown in FIG. 6, a player uses virtual items 632 to capture one or more virtual elements 630. In particular, a player can deploy virtual items 632 at locations in the virtual world 610 proximate or within the virtual elements 630. Deploying one or more virtual items 632 in this manner can result in the capture of the virtual element 630 for the particular player or for the team/faction of the particular player.

In one particular implementation, a player may have to gather virtual energy as part of the parallel reality game. As depicted in FIG. 6, virtual energy 660 can be scattered at different locations in the virtual world 610. A player can collect the virtual energy 660 by traveling to the corresponding location of the virtual energy 660 in the actual world 600. The virtual energy 660 can be used to power virtual items or to perform various game objectives in the game. A player that loses all virtual energy 660 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Figure 7:
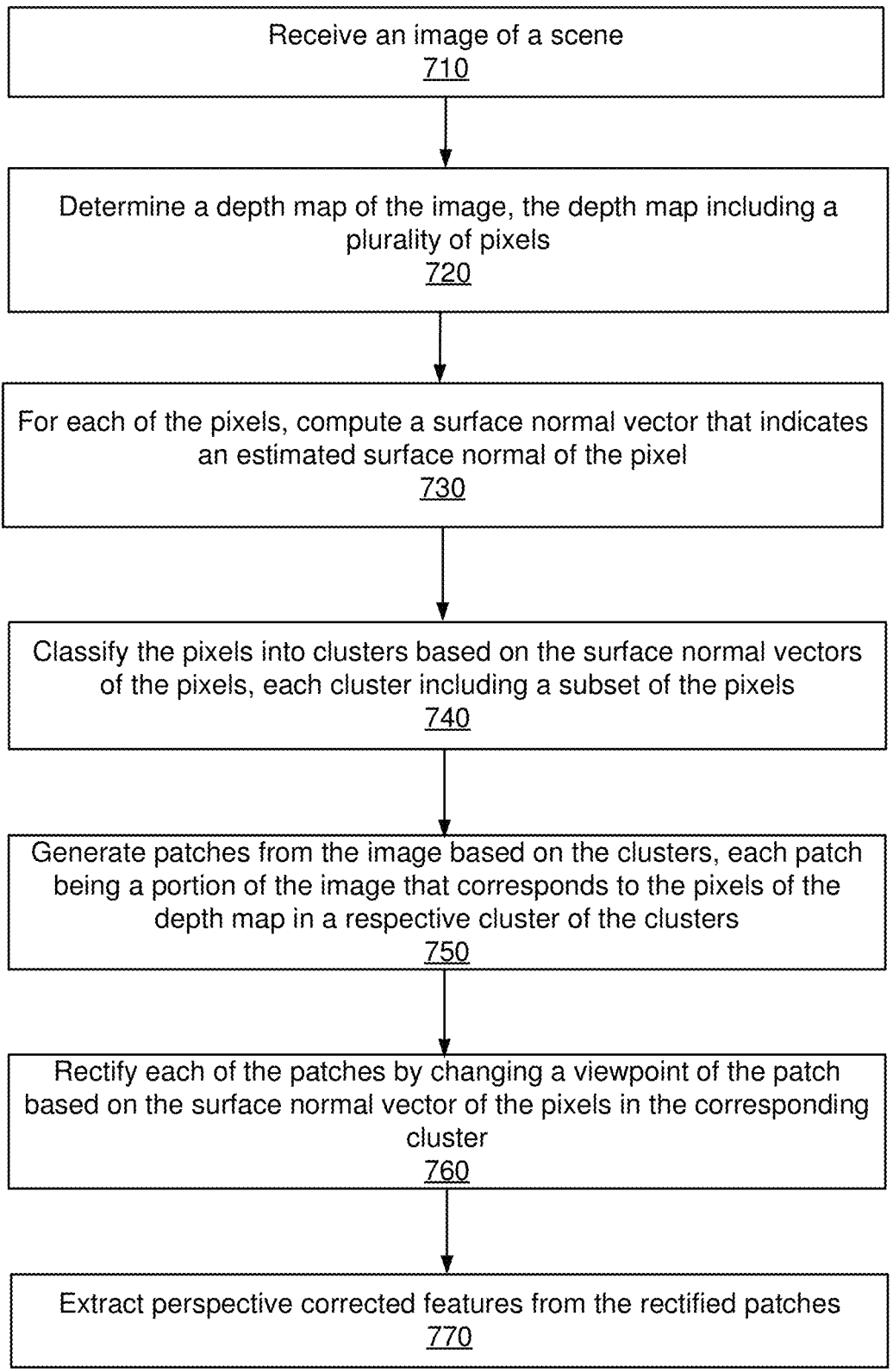
FIG. 7 is a flow chart illustrating a method of extracting perspective corrected features from an image, according to one embodiment.

FIG. 7 is a flow chart illustrating a method 700 of extracting perspective corrected features from an image, according to one embodiment. In some embodiments, the method 700 is performed by the feature matching system 140, although some or all of the operations in the method 700 may be performed by other entities in other embodiments. In some embodiments, the operations in the method 700 are performed in a different order and can include different or additional steps.

The feature matching system 140 receives 710 an image of a scene. The feature matching system 140 determines a depth map 720 of the image. In some embodiments, the feature matching system 140 determines the depth map of the image by inputting the image into a model. The model is trained to receive images and outputting depth maps of the received images. In one example, the model is trained by using machine learning techniques based on a training set. The training set includes a group of images and a depth map of each image in the group. The model, in some embodiments, is a convolutional neural network.

The feature matching system 140 computes 730 a surface normal vector for each (or a subset) of the pixels of the depth map. The surface normal vector indicates an estimated surface normal of the pixel. In some embodiments, the feature matching system 140 back projects the pixels in the depth map to points in a point cloud. The feature matching system 130 computes the surface normal vectors for the pixels in the point cloud.

The feature matching system 140 classifies 740 the pixels into clusters based on the surface normal vectors of the pixels, each cluster including a subset of the pixels. In some embodiments, the feature matching system 140 uses k-means clustering to classify the pixels into the clusters. In some embodiments, the feature matching system 140 classifies the surface normal vectors into three clusters based on the surface normal vectors of the pixels. The three clusters corresponding to three planes orthogonal to each other in a three-dimensional space.

The feature matching system 140 generates 750 patches from the image based on the clusters. Each patch is a region of connected pixels in the image. The region of connected pixels in the image corresponds to at least some of the pixels in the depth map in one of the clusters. In some embodiments, the feature matching system 140 generates multiple patches for one cluster.

The feature matching system 140 rectifies 760 a perspective distortion of each respective patch of the patches based on the surface normal vectors of the pixels in the corresponding cluster to generate a rectified patch. In some embodiments, the feature matching system 140 computes a homography that simulates a virtual camera that has a same camera center as a camera capturing the image and has an optical axis along an estimated surface normal of the corresponding cluster. In one embodiment, the estimated surface normal of the corresponding cluster is a mean of the surface normal vectors in the corresponding cluster. The feature matching system 140 uses the homography to perform a projective transformation to transform the patch to the rectified patch.

In some embodiments, the feature matching system 140 determines whether an angle difference between an optical axis of the camera and a surface normal of a patch is greater than a threshold, e.g. 80 degrees. In response to determining that the angle difference between the optical axis of the camera and the surface normal of the patch is greater than 80 degrees, the feature matching system 140 identifies a portion of the patch. An angle difference between the optical axis of the camera and a surface normal of the identified portion of the patch is not greater than 80 degrees. The feature matching system 140 rectifies the identifying portion of the patch without rectifying the rest of the patch.

The feature matching system 140 extracts 770 perspective corrected features from the rectified patches. The feature matching system 140 matches the perspective corrected features with features of another image to re-localize an object in the scene. In some embodiments, the feature matching system 140 identifies a planar and non-planar portions of the image. The feature matching system 140 generates a perspective corrected image and extracts the rectified patches from the planar portion of the image. The feature matching system 140 extracts features from the rectified patches. In some embodiments, the feature matching system 140 also extracts features from non-planar portion of the image. The final set of features used for feature matching includes the perspective corrected features and features extracted from non-planar portion of the image.

Example Computing System

Figure 8:
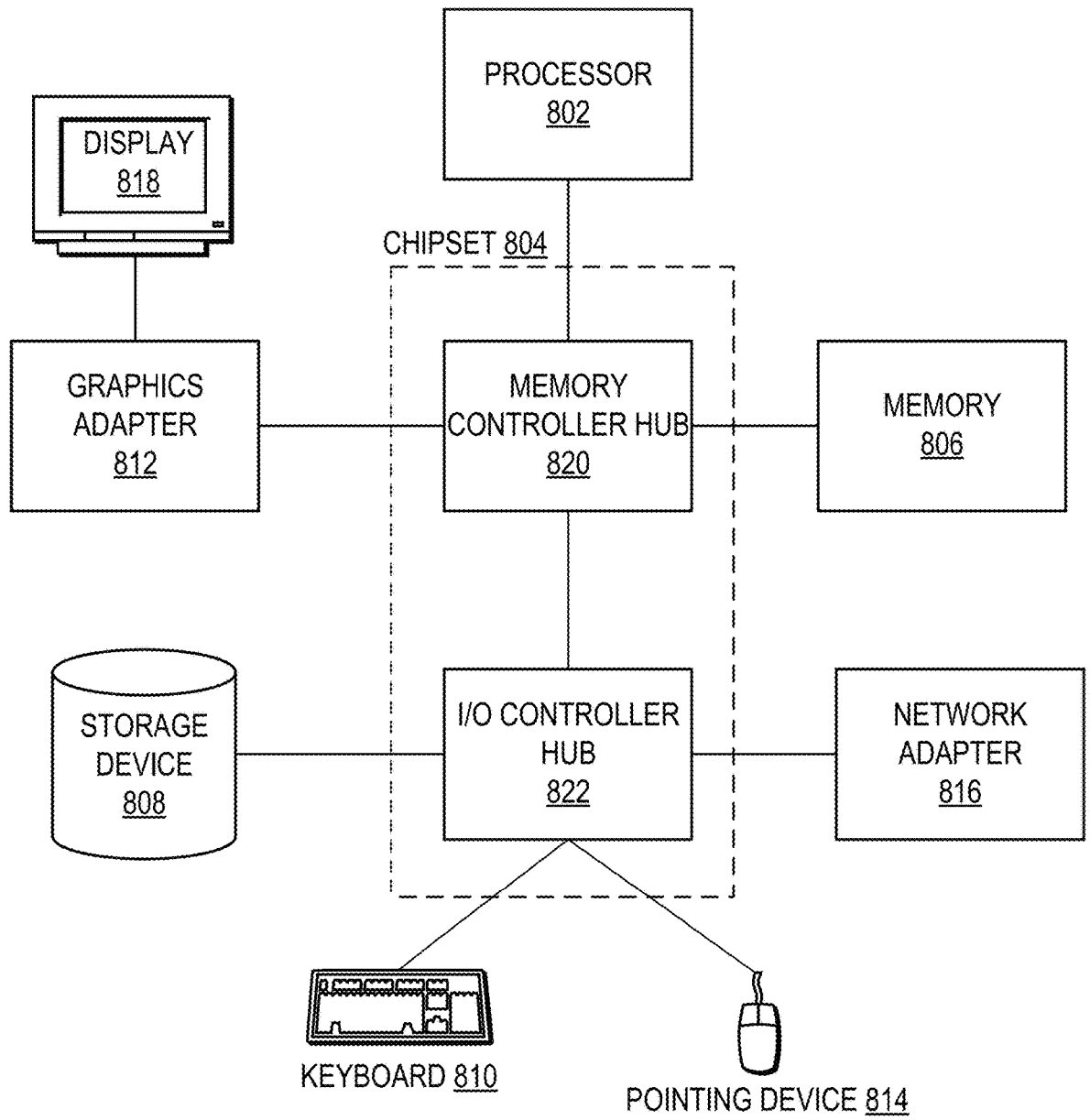
FIG. 8 is a high-level block diagram illustrating a functional view of a typical computer system for use as the feature matching system of FIG. 4 according to an embodiment.

FIG. 8 is a block diagram illustrating a functional view of a typical computer system 800 for use as a client device 110, server 120, or feature matching system 140 of FIG. 1, according to an embodiment. Although FIG. 8 depicts illustrates various physical components of a computer used as part or all of one or more entities described herein, a computer may have additional, less, or variations of the components shown in FIG. 8. As recognized by those of ordinary skill in the art, items shown separately could be combined and some items could be separated into multiple parts.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random access memory, such as DRAM, SRAM, DDR RAM, ROM, EEPROM, flash memory.

As is known in the art, a computer 800 can have different or other components than those shown in FIG. 8. In addition, the computer 800 can lack certain illustrated components. In one embodiment, a computer 800 acting as a server may lack a keyboard 810, pointing device 814, graphics adapter 812, or display 818. Moreover, the storage device 808 can be local or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 808, loaded into the memory 806, and executed by the processor 802.

Additional Considerations

Some portions of above description describe the embodiments in terms of algorithmic processes or operations. These algorithmic descriptions and representations are commonly used by those skilled in the data processing and computer vision arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A computer-implemented method comprising:
receiving an image of a scene, the image including pixels;
determining a depth map of the image, the depth map including a plurality of pixels;
for each of the pixels in the depth map, computing a surface normal vector that indicates an estimated surface normal of the pixel in the depth map;
classifying the pixels in the depth map into clusters based on the surface normal vectors of the pixels in the depth map, each cluster including a subset of the pixels in the depth map;
generating patches of connected pixels in the image based on the clusters of the depth map, wherein one of the patches of the image corresponds to one of the clusters of the depth map;
rectifying a perspective distortion of each respective patch of the patches based on the surface normal vectors of the pixels of the depth map in the corresponding cluster to generate a rectified patch, wherein rectifying the perspective distortion of a first patch of the patches comprises:

determining a first angle difference between an optical axis of a camera that captured the image and a surface normal of the first patch;

subsequent to determining the first angle difference is greater than a threshold, identifying a portion of the first patch based on a second angle difference between the optical axis of the camera and a surface normal of the portion of the first patch, wherein the second angle difference is not greater than the threshold; and rectifying a perspective of the identified portion of the first patch without rectifying a remaining portion of the first patch; and extracting perspective corrected features from the rectified patches, the perspective corrected features to be used for feature matching.

2. The computer-implemented method of claim 1, wherein determining the depth map of the image comprises:
determining the depth map of the image by inputting the image into a model, the model trained to receive images and output depth maps of the received images.

3. The computer-implemented method of claim 2, wherein the model is a convolutional neural network.

4. The computer-implemented method of claim 1, wherein classifying the pixels into the clusters based on the surface normal vectors of the pixels comprises:
using k-means clustering to classify the pixels into the clusters based on the surface normal vectors of the pixels.

5. The computer-implemented method of claim 1, wherein classifying the pixels into the clusters based on the surface normal vectors of the pixels comprises:
classifying the surface normal vectors into three clusters based on the surface normal vectors of the pixels, the three clusters corresponding to three planes orthogonal to each other in a three-dimensional space.

6. The computer-implemented method of claim 1, wherein rectifying the perspective distortion of each respective patch of the patches based on the surface normal vectors of the pixels in the corresponding cluster to generate the rectified patch comprises:
computing a homography that simulates a virtual camera that has a same camera center as the camera that captured the image and has an optical axis along an estimated surface normal of the corresponding cluster; and
using the homography to perform a projective transformation to the patch to generate the rectified patch.

7. The computer-implemented method of claim 6, wherein the estimated surface normal of the corresponding cluster is a mean of the surface normal vectors of the pixels in the corresponding cluster.

8. The computer-implemented method of claim 1, wherein the threshold is 80 degrees.

9. The computer-implemented method of claim 1, wherein extracting the perspective corrected features from the rectified patches comprises:
identifying a non-planar portion of the image that is not included in any of the patches;
extracting features from the non-planar portion of the image; and
extracting features, the features including the perspective corrected features and features extracted from the non-planar portion of the image.

10. The computer-implemented method of claim 1, further comprising:
matching the perspective corrected features with features of a second image to re-localize the image with respect to the second image.

11. A non-transitory computer-readable memory storing executable computer program instructions, the instructions executable to perform operations comprising:
receiving an image of a scene, the image including pixels;
determining a depth map of the image, the depth map including a plurality of pixels;
for each of the pixels in the depth map, computing a surface normal vector that indicates an estimated surface normal of the pixel in the depth map;
classifying the pixels in the depth map into clusters based on the surface normal vectors of the pixels in the depth map, each cluster including a subset of the pixels in the depth map;
generating patches of connected pixels in the image based on the clusters of the depth map, wherein one of the patches of the image corresponds to one of the clusters of the depth map;
rectifying a perspective distortion of each respective patch of the patches based on the surface normal vectors of the pixels of the depth map in the corresponding cluster to generate a rectified patch, wherein rectifying the perspective distortion of a first patch of the patches comprises:
determining a first angle difference between an optical axis of a camera that captured the image and a surface normal of the first patch;
subsequent to determining the first angle difference is greater than a threshold, identifying a portion of the first patch based on a second angle difference between the optical axis of the camera and a surface normal of the portion of the first patch, wherein the second angle difference is not greater than the threshold; and
rectifying a perspective of the identified portion of the first patch without rectifying a remaining portion of the first patch; and
extracting perspective corrected features from the rectified patches, the perspective corrected features to be used for feature matching.

12. The non-transitory computer-readable memory of claim 11, wherein determining the depth map of the image comprises:
determining the depth map of the image by inputting the image into a model, the model trained to receive images and output depth maps of the received images.

13. The non-transitory computer-readable memory of claim 11, wherein classifying the pixels into the clusters based on the surface normal vectors of the pixels comprises:
using k-means clustering to classify the pixels into the clusters based on the surface normal vectors of the pixels.

14. The non-transitory computer-readable memory of claim 11, wherein classifying the pixels into the clusters based on the surface normal vectors of the pixels comprises:
classifying the surface normal vectors into three clusters based on the surface normal vectors of the pixels, the three clusters corresponding to three planes orthogonal to each other in a three-dimensional space.

15. The non-transitory computer-readable memory of claim 11, wherein rectifying the perspective distortion of each respective patch of the patches based on the surface normal vectors of the pixels in the corresponding cluster to generate the rectified patch comprises:

computing a homography that simulates a virtual camera that has a same center as the camera that captured the image and has an optical axis along an estimated surface normal of the corresponding cluster; and using the homography to perform a projective transformation to the patch to generate the rectified patch.

16. The non-transitory computer-readable memory of claim 11, wherein the threshold is 80 degrees.

17. The non-transitory computer-readable memory of claim 11, wherein extracting the perspective corrected features from the rectified patches comprises:

identifying a non-planar portion of the image that is not included in any of the patches;

extracting features from the non-planar portion of the image; and extracting features, the features including the perspective corrected features and features extracted from the non-planar portion of the image.

18. The non-transitory computer-readable memory of claim 11, further comprising:

matching the perspective corrected features with features of a second image to re-localize the image with respect to the second image.

19. A computer system, comprising:

a computer processor for executing computer program instructions; and a non-transitory computer-readable memory storing computer program instructions executable by the computer processor to perform operations comprising:

receiving an image of a scene, the image including pixels;

determining a depth map of the image, the depth map including a plurality of pixels;

for each of the pixels in the depth map, computing a surface normal vector that indicates an estimated surface normal of the pixel in the depth map;

classifying the pixels in the depth map into clusters based on the surface normal vectors of the pixels in the depth map, each cluster including a subset of the pixels in the depth map;

generating patches of connected pixels in the image based on the clusters of the depth map, wherein one of the patches of the image corresponds to one of the clusters of the depth map;

rectifying a perspective distortion of each respective patch of the patches based on the surface normal vectors of the pixels of the depth map in the corresponding cluster to generate a rectified patch, wherein rectifying the perspective distortion of a first patch of the patches comprises:

determining a first angle difference between an optical axis of a camera that captured the image and a surface normal of the first patch;

subsequent to determining the first angle difference is greater than a threshold, identifying a portion of the first patch based on a second angle difference between the optical axis of the camera and a surface normal of the portion of the first patch, wherein the second angle difference is not greater than the threshold; and rectifying a perspective of the identified portion of the first patch without rectifying a remaining portion of the first patch; and extracting perspective corrected features from the rectified patches, the perspective corrected features to be used for feature matching.

20. The computer system of claim 19, wherein classifying the pixels into the clusters based on the surface normal vectors of the pixels comprises:

classifying the surface normal vectors into three clusters based on the surface normal vectors of the pixels, the three clusters corresponding to three planes orthogonal to each other in a three-dimensional space.

* * * * *